Aug. 19, 1958    G. W. WILLARD    2,847,876
TRANSMISSION
Filed July 3, 1952    3 Sheets-Sheet 1

INVENTOR.
GEORGE W. WILLARD
BY Woodling and Krost
attys

Aug. 19, 1958

G. W. WILLARD 2,847,876

TRANSMISSION

Filed July 3, 1952

INVENTOR.
GEORGE W. WILLARD

BY Woodling and Kroet
attys

Aug. 19, 1958 G. W. WILLARD 2,847,876
TRANSMISSION
Filed July 3, 1952 3 Sheets-Sheet 3

INVENTOR.
GEORGE W. WILLARD
BY Woodling and Krost
attys

United States Patent Office 2,847,876
Patented Aug. 19, 1958

2,847,876

TRANSMISSION

George W. Willard, Springfield, Mo.

Application July 3, 1952, Serial No. 297,102

21 Claims. (Cl. 74—751)

My invention relates in general to the transmission of power, and relates more specifically to a mechanical transmission for the regulation of speed and the adjustment of speed-power ratio.

In general my invention can be described in connection with any machine requiring:

(1) The regulating of speed, that is, where a definite speed ratio between the driving and driven component parts must be achieved and maintained; and (2) The converting of torque, where it is desirable for one reason or another to receive power at one angular velocity and torque, and to convert this same power to a different angular velocity and corresponding torque.

An object of my invention is to provide a mechanism whereby a relatively large amount of power may be transmitted at controlled velocities and torques within a range of speeds, the controlled speeds and torques being governed by a comparatively small application of force.

Another object of my invention is to provide a power transmission possessing the characteristics of infinite torque multiplication within a selected range. The extent of the torque multiplication being either operator-adjustable or fully automatic as the choice might be.

Another object of my invention is to provide a torque converter of a specific mechanical structure whereby the acting and reacting forces inherent within the transmission itself are utilized to automatically select the optimum speed ratio between the driving and driven units conducive to the most efficient over-all operation.

While the above are perhaps some of the most important objects of my invention, a study of the following description and drawings will disclose additional desirable functional features whose presence can only be attributed to the peculiar coordination of the elementary parts within the structure itself.

In order to assist in a clearer understanding of the construction and operation of the transmission, it can be analyzed into five main elements; namely, a driving means, a driven means, an interconnecting means, a constraining and regulating means, and speed ratio-selecting means.

Also, when used in conjunction with the speed ratio-selector means, there is a clutching means providing a harmless slippage in the event the resistance became greater than its predetermined torque transmitting capacity.

In most embodiments there is a governor to engage and disengage the clutch at a predetermined speed.

In examining the elementary units by themselves, one must not be misled into the erroneous notion of considering any of them as an ultimate within itself, but rather should always keep in mind that the five elements would have very little use within themselves and must be coordinated together in a particular way in order to operate as a unit capable of fulfilling the definite and specific objects which I have previously set forth.

Figure 1:
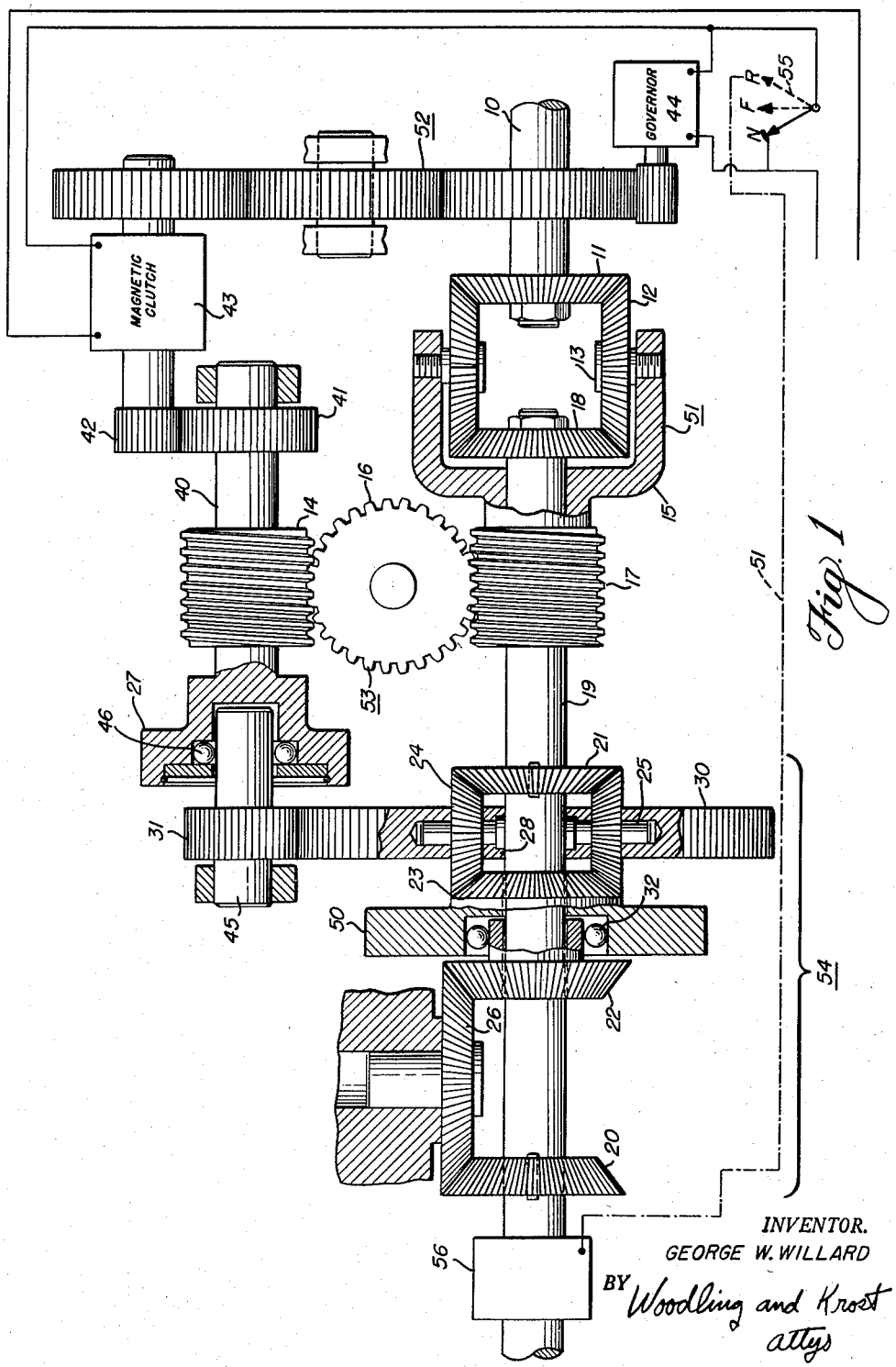
Figure 1 is a diagrammatic illustration of a transmission employing the principles of this invention.

Referring to Figure 1 for detailed explanation of the construction and operation of the transmission, there is illustrated a driving shaft 10 and a driving gear 11. A driven shaft 19 and a driven gear 18. Each gear is fastened to its respective shaft. In this particular embodiment the two shafts are coaxially aligned. An interconnecting unit 51 comprising, a carrier 15, which is journaled on the shaft 19 and is free to rotate independently of shaft 19, and a plurality of pinion gears 12 journaled on studs 13. The studs 13 are supported by carrier 15. The pinion gears 12 are free to rotate either around their axes or to rotate with the carrier around its axis or both, depending upon the forces acting upon the unit. The pinion gears 12 are always in constant mesh with the gears 11 and 18.

Driving shaft 10 and driving gear 11 receive motion from a source of rotary power, not shown. This motion is transmitted to the driven shaft 19 and driven gear 18 through the pinion gears 12 of the interconnecting unit 51. While it is possible to design the transmission to rotate either clockwise or counterclockwise, it will be assumed, unless otherwise stated, that the driving gear 11 is rotating in the direction of the arrow, which would be clockwise when viewed from the extreme right-hand end.

One embodiment of a motion-regulating and constraining unit, indicated generally by reference character 53, comprises a first worm gear 14, a worm wheel 16, and a second worm gear 17. The obliquity of their teeth is such that the gears are not reciprocal; that is, the worm gears 14 or 17 can drive the worm wheel 16 but the worm wheel 16 cannot drive the worm gears 14 or 17. In this embodiment the worm gear 17 is non-rotatively secured to the carrier 15 and must therefore rotate with carrier 15. Worm gear 17 is identical to worm gear 14 and both are in constant mesh with worm wheel 16.

It can be seen from the drawing that the worm gear 14 is keyed to a shaft 40. Also, that under predetermined conditions the shaft 40 and the worm gear 14 can be driven in a definite speed ratio through a gear train 52 including gears 41 and 42 by the driving shaft 10. It should be noted from the drawing that the gear 42 is not keyed directly to shaft 10 but rather is coupled to it by any proven clutching means 43.

While any clutching means would suffice, I have chosen a clutch the fluid magnetic type for reasons that it possesses several operational characteristics that act in harmony with the desired functions of the transmission. The primary requisites to the clutch would be: (1) sufficient torque transmitting capacity to drive the shaft 40 and worm 14 when it is desired, and (2) ability to slip without doing any damage should the resistance become too great. The fluid magnetic clutch possesses both of these attributes but so do some other slipping clutches. In referring hereinafter to the clutching means, I will describe its operation in terms of a fluid magnetic clutch.

However, it will be clear that any other clutching means possessing the two characteristics mentioned above could be substituted.

A governor 44, which is driven by shaft 10 as illustrated, has for its purpose the control of energizing and de-energizing of the fluid magnetic clutch 43.

The fifth element of the illustrated embodiment of the invention is the speed ratio-selector unit 54 which comprises the following component parts: a pair of gears 20 and 21, which are keyed to shaft 19 and must, therefore, rotate with shaft 19; a gear 22 which is journaled on shaft 19 and is free to turn independently of shaft 19. The gear 22 is driven by an idler gear 26 which in turn received its motion from gear 20. A gear 23 is also journaled on shaft 19 and is free to rotate independently on shaft 19. It can be seen from the drawing that gear 23 has an enlarged section 50 which produces a fly-wheel effect once gear 23 has been put in motion. Gear 22 drives gear 23 through an overrunning clutch 32. However, the gear 23 cannot drive the gear 22 due to the connecting overrunning clutch. In mesh with the gears 21 and 23 are a plurality of pinions 24. These are journaled on studs 25. The studs 25 are radial projections of a sleeve 28. Sleeve 28 is journaled on shaft 19 and free to turn independently on the axis of shaft 19.

To summarize, gears 20 and 21 will always be driven in the same direction and at the same velocity as shaft 19. Gear 22 will always rotate at the same velocity but always in an opposite direction than gears 20 and 21. Gear 23 and the fly-wheel 50 must always rotate in the same direction as gear 22 but not necessarily at the same velocity. Once gear 23 and fly-wheel 50 have been put into motion they would continue to rotate for a limited time in the event that for one reason or another the speed of gear 22 is decelerated. In the event of a difference in speed between gears 23 and 21, sleeve 28 would rotate in the direction of the fastest gear, which would be gear 23 and at one-half the difference between their speeds. A gear 30 is fastened to the radial studs 25, and its axis coincides with the axis of sleeve 28. Therefore, any rotational movement of sleeve 28 and radial arms 25 would simply rotate gear 30 around shaft 19.

The gear 30 is in mesh with a gear 31. Gear 31 is keyed to a stub shaft 45. Shaft 45 is driven by any rotation of sleeve 28 and radial arms through gears 30 and 31. It will be noted that the ratio between gears 30 and 31 is relatively large. This would permit a comparatively high speed for shaft 45 in relation to the speed of sleeve 28.

The shaft 45 is connected to the shaft 40 by an overrunning clutch 46. Shaft 45 can drive shaft 40 but shaft 40 cannot drive shaft 45 due to the connecting overrunning clutch.

The above is a description of the arrangement and corelationship of the various structural parts. An explanation of their function and operation in actual practice of the transmission will follow. However, before beginning a detailed explanation of the operation of my transmission, it might be well to point out the behavior of the interconnecting unit under all possible conditions when it is acted upon by the various forces produced by the driving and driven means. In the analysis we find there are five possible situations, namely:

*Case 1.*—When the driving and driven means (10 and 19) are rotating in the same direction and at the same speed, the interconnecting unit 51 will rotate in the same direction and at the same speed.

*Case 2.*—When the driving and driven means (10 and 19) are rotating in the same direction but at different speeds, the interconnecting unit 51 will travel in the same direction and at the intermediate speed.

*Case 3.*—When the driving means (10) is rotating and the driven means (19) is stationary, the interconnecting unit 51 will travel in the direction of the driving means and at one-half of its speed.

*Case 4.*—When the driving and driven means (10 and 19) are rotating at the same speed but in opposite directions, the interconnecting unit 51 will be stationary.

*Case 5.*—When the driving and driven means (10 and 19) are rotating in opposite directions but at different speeds the interconnecting unit 51 will rotate in the direction of the fastest gear and at a speed equal to one-half their difference.

The fastest speed of the driven shaft 19 is obtained when the worm gear 14 and shaft 40 of the regulating and constraining means are stationary. When the gear 11 is driving, the interconnecting unit 51 with its worm gear 17 would have a tendency to turn in the direction of the driving gear 11, due to the reacting forces of the driving and driven parts. However, this would be prohibited because any turning of worm gear 17 would have to be transmitted to the worm wheel 16, but worm wheel 16 cannot drive worm gear 14 due to the obliquity of their mating teeth, hence the interconnecting unit would be stationary, fulfilling the requirements of Case 4.

The slowest speed, or zero velocity, of the driven shaft 19 is obtained by permitting the interconnecting unit 51 to rotate in the direction of the driving gear 11 at one-half its speed as in Case 3. This is accomplished by connecting shaft 10 to gear 42 by engaging the clutch 43. The gears 41 and 42 are at a two-to-one ratio. This would permit shaft 40 to be driven by the driving shaft 10 at one-half speed of shaft 10, and consequently wheel 16 will allow worm 17 and carrier 15 to rotate at half the speed of shaft 10, fulfilling the requirements of Case 3.

The intermediate speeds of the driven shaft 19, which would be infinitely variable within a definite range, are obtained by controlling the speed at which the interconnecting unit 51 is rotating in relationship to the driving speed, so that the requirements of Case 5 are fulfilled.

Attention should be called to the fact that while the speed of the driven shaft 19 can be varied by changing the speed of shaft 40, the regulating and constraining means 53 never drives the interconnecting unit 51. In fact, just the opposite occurs because the natural tendency of the interconnecting unit 51 would be to rotate in the same direction as the immediate driver when acted upon by the driving and driven forces. However, the nonreciprocal characteristics between the worm wheel 16 and the worm gear 14 would limit any turning and would simply synchronize or adjust the speed of the interconnecting unit 51 to correspond with the speed of the regulating and constraining means 53. In other words, rotation of the shaft 40 and worm gear 14 simply permits the worm wheel 16 to rotate if it is being driven by worm 17.

Since the regulating and constraining means would never drive the interconnecting unit, but only limit its turning in a direction it would normally rotate, it is apparent that the only force necessary to control the speed of the driven shaft 19 would be the force necessary to actuate the regulating and constraining unit 53. This force, of course, would be relatively small and the value of this mechanism would be that power in large magnitudes could be transmitted at variable speeds and torques. These variable speeds being controlled by an extremely small force.

The means used to control the particular actions of the transmission would be similar to those now being used in various types of automatic torque converters. There is a movable selector arm 55 adjustable to at least three positions; namely, neutral, drive, and reverse. These positions are indicated by N—F—R. There could, of course, be a fourth and fifth position upon the indicating sector for low and park if so desired, when used on a motor vehicle.

The operation of a motor vehicle will be used as an example of the use of the invention. When starting the motor of the motor vehicle, the selector arm would be positioned at neutral, which is the standard procedure. When the selector arm is at neutral, the clutch 43 is energized (see diagram) and connects the gear 42 to the driven shaft 10. The shaft 10 then drives the shaft 40 and the worm gear 14 at one-half the speed of shaft 10, since the ratio of gear 42 to gear 41 is two-to-one. This permits the interconnecting unit to turn at one-half the speed of shaft 10, hence no power could be transmitted to the driven shaft 19. Regardless of how fast or how slow the motor runs, the interconnecting unit would always turn at half the speed of shaft 10, due to the fixed ratios between gears 42 and 41.

The governor 44 is adapted to electrically energize the electromagnetic clutch 43, in the embodiment of the invention illustrated, and cause a drive connection through clutch 43 to be made at low speeds of drive shaft 10. Engagement of clutch 43 to transmit driving force from shaft 10 to shaft 40 stops power transmission from shaft 10 to shaft 19. Therefore, when the selector arm is moved from neutral to drive position and the motor is idling, the shaft 19 still would receive no power at low engine speeds due to the influence of governor 44.

The governor 44, which is driven by shaft 10, is set to allow the clutch 43 to be energized at low speed of shaft 10, thus retaining the driving connection between shaft 10 and gear 42 at low speed. Upon acceleration of the motor the driving shaft 10 would naturally speed up and at a predetermined speed the governor will shut off the supply of current to clutch 43 and terminate the driving interconnection between shaft 10 and shaft 40. When the shafts 10 and 40 are no longer drivingly connected, the driving effect of shaft 10 upon shaft 19 can be altered by at least three methods or a combination of two of them. This narrowing of the ratio, or shifting up, can be accomplished either manually or automatically.

Since at the moment clutch 43 is de-energized the shaft 19 would possess zero velocity, any alteration in its speed would have to be an increase in speed. The first method in narrowing the ratio between the shaft 10 and shaft 19 is automatic. This is accomplished by keeping the speed of shaft 10 constant. A fly-wheel 27, which is attached to the shaft 40, then drives the regulating and constraining unit. The fly-wheel 27 possesses a certain amount of energy due to having been put in motion, and will drive the shaft 40 of the regulating and constraining unit at a decreasing rate of speed for a limited time. As the speed of the regulating and constraining unit 53 decreases, the speed of the interconnecting unit 51 must also decrease. Any decrease in speed of the interconnecting unit permits the shaft 10 to drive the shaft 19 at an increasing rate of speed. The time required for bringing the regulating and constraining unit 53 to a stop may be selected by the weight of fly-wheel 27 and the design of the worm teeth. For example, by using spiral gears with high pressure angles, which are actually no more than a worm and worm gear with spiraling teeth, the shaft 40 may be kept rotating almost indefinitely once it has been put into motion. It is true that gear 16 can never actually drive worm 14 in this invention, but with proper design of teeth, once shaft 40 is put into motion, and clutch 43 de-energized, the rotation can be maintained. Likewise the rate of slow down can be engineered exactly. Thus, if desired, the ratio between shafts 10 and 19 can be varied by speeding up the drive alone until put into a one-to-one ratio as explained elsewhere herein.

The second method would be to continue to accelerate the shaft 10, with selector arm 55 at F, then as the speed of gear 11 increases, the governor 44 cuts out the clutch 43 and the speed of shaft 19 increases. Also, the ratio of shaft 10 and shaft 19 is narrowed because shaft 40 will gradually come to a stop as friction uses up the energy of the fly-wheel 27.

Neglecting for the moment any decrease in the speed of the regulating and constraining unit 53 due to the frictional resistance, the regulating and constraining unit would have a constant speed, but the speed of gear 11 can be increased by accelerating shaft 10. Therefore, since the speed of shaft 19 would always be the difference between the speed of shaft 10 and twice the speed of the regulating and constraining unit, any increase in the velocity of shaft 10 would both increase the speed of shaft 19 and narrow the ratio between them.

A third method of narrowing the ratio between shaft 19 and shaft 10 would be to momentarily let the shaft 19 become the driver after it had been given rotational movement. This is accomplished by retarding the throttle, thus allowing a decrease in the engine speed. The power due to the inertia of the driven parts would then become the driver and the interconnecting unit would have a tendency to turn in the same direction as shaft 19. However, this tendency of the interconnecting unit to reverse would be prevented due to the fact that wheel 16 cannot drive gear 14. Therefore, the great force of the driven parts, acting as driving parts, would bring the regulating and constraining unit to a complete stop. The driven and driving shafts would then be in a one-to-one ratio. Upon advancing the throttle the shaft 10 would once against drive the shaft 19 and the ratio would remain one-to-one because the regulating and constraining units would possess no motion.

It is obvious that the operator can instantly adjust the ratio to one-to-one at will. This is a very desirable feature.

While the above are the three basic methods by which the operator can shift up or narrow the ratio, it should be apparent that by using a combination of either two or three methods together, an infinite variety of ratios can be selected at will to meet all needs.

Once the motor vehicle has been put in motion any down shifting or widening of the ratio is generally done automatically by the action of the speed ratio selector unit 54. However, it is both practical and possible for the operator to do this at any time should he so desire. This is done by moving the selector lever to neutral position, thus energizing the clutch. Then the gear 42 is connected to the shaft 10 and will be drivingly connected to the regulating and constraining unit. Upon acceleration of the motor, the regulating and constraining unit would have a tendency to speed up. The speed of the regulating and constraining unit would, however, be limited by two factors: (1) the speed of shaft 10; (2) the speed of shaft 19. The speed of the interconnecting unit and regulating and constraining unit must always be one half the difference in the speed of shaft 10 and shaft 19. Therefore, if shaft 19 is rotating at a certain speed, the shaft 10 must be accelerated by the motor until its speed reaches the necessary speed to fulfill the requirement for a specific ratio. The selector lever is then moved back to "drive" position and the vehicle would then be driven for a short duration at the selected ratio.

In the event that the motor is attempting to drive the regulating and constraining unit at a speed greater than one-half the difference between shaft 10 and shaft 19 due to the fixed two-to-one ratio between gears 42 and 41, but was prevented from obtaining this speed due to the speed of shaft 19, there would be no breakage of parts, but only a slippage in clutch 43 as has been prescribed. This self-synchronization of the interconnecting unit would always insure against sudden shock when changing the speed ratio. This certainly is a valuable feature.

By examining the foregoing it can be observed that the transmission when once put in motion and left unacted upon would sooner or later reach its maximum limit, which in this embodiment would be a one-to-one ratio.

There would be, however, conditions encountered in the actual operation where a one-to-one ratio would be too high or too narrow, then there would have to be a shifting down or widening of the ratio. It has already been explained how this widening of the ratio is done manually.

The transmission shown in Figure 1 is designed primarily to be used in the automotive field and is equipped with a special type of speed ratio selector unit, whose construction has already been disclosed. This unit has a particular mechanical structure so that when it is used in conjunction with the other units of the transmission it automatically insures the ideal speed ratio between the driving and driven parts for all driving conditions.

These particular qualities inherent within the speed ratio selector can best be pointed out by picturing the working of the various parts in actual operation.

This ratio can only be widened automatically by the speed ratio selector unit 54 when two conditions exist. These conditions are: (1) the motor must be driving the car, and (2) there must be a decrease in the speed of the car. These conditions must always be present together; that is, they must exist simultaneously. This is a very important feature since the transmission would not invariably shift down automatically even though the car were losing speed.

Assume that the car has been started and put in motion by the already discussed procedure. Further assume that the ratio has been narrowed until a one-to-one ratio is in effect. This would not necessarily have to be the case. The shafts 10 and 19 are now revolving at the same velocity but in an opposite direction with respect to each other. As long as the motor is developing sufficient power to overcome the load resistance, there would be no decrease in the speed of shaft 19. But suppose a steep grade is encountered, then in order to maintain or increase the speed of the car, the throttle must be advanced. However, if the increase of the load, due to the steepness of the hill, was greater than the added power developed by the motor upon advancing the throttle, then there would be a decrease in the speed of the car and consequently the speed of shaft 19.

It is at this point that the speed ratio selector automatically begins to exert its influence upon the regulating and constraining unit, thereby widening the ratio between shafts 10 and 19 and lessening the load.

Until shaft 19 begins to lose speed, the gear 30 remains stationary, hence so does the shaft 45, since gears 23 and 21 are revolving at the same velocity. But now shaft 19 and the attached gears 21 are losing speed, but the gear 23 is revolving at approximately the maximum attained velocity due to the stored energy of fly-wheel 50. Therefore, there is a difference in the speed of gears 21 and 23. This difference in the speed causes the gear 30 to turn in the direction of the fastest turning gear; namely, gear 23. The gear 30 then drives the shaft 45 through the gear 31. Shaft 45 in turn drives the regulating and constraining unit through the overrunning clutch. The turning of the regulating and constraining unit permits a corresponding turning in the interconnecting unit, thus widening the ratio. This suggested construction can be altered in many ways to suit specific preference. For example, the gear 30 could be an actuation device for an electrical drive mechanism to drive the shaft 40. Thus, no actual power would be transmitted from the gear (or its substitute) 30 to shaft 40.

As the ratio between shafts 10 and 19 is widened, there would be a lessening in the load due to the lower speed.

Until shaft 19 begins to lose speed, the gear 30 remains stationary and hence so does the shaft 45, because gears 23 and 21 revolve at the same velocity so long as the shaft 19 maintains its driving action upon the gear 23. However, if the shaft 19 and the attached gears 20 and 21 lose speed, then the gear 23 loses its driven contact with the gears 20 and 21 and begins to revolve freely because of its stored energy. The fly wheel portion 50 of gear 23 was provided purposely in order that the gear 23 could act as a fly wheel in the event the shaft 19 began to slow up. As a consequence, there is produced a difference in the speed of rotation between gears 21 and 23. This difference in the speed causes the gear 30 to turn in the direction of the fastest turning gear, which of course is the gear 23. The gear 30 then drives the shaft 45 through the gear 31. The shaft 45 in turn drives the shaft 40 of the regulating and constraining unit through the overrunning clutch 46. Rotation of the shaft 40 permits a corresponding turning of the worm wheel 16, which is attempting to rotate because of the attempt of carrier 15 to drive worm wheel 16 through the worm gear 17. The rotation of the shaft 40 therefore permits rotation of the carrier 15 and thus provides a widening of the ratio between shafts 10 and 19. As the ratio between the shafts 10 and 19 is widened, there is a greater mechanical advantage for driving the load. The vehicle may therefore be driven at a slow speed at a greater power, or the engine speed can be increased to maintain the desired road speed.

This lessening of the load would permit the motor to speed up. An increase in the speed of the motor would result in an increase of power developed by the motor. This two-fold effect of load lessening and power-increasing would continue until the power developed would be sufficient to overcome the resistance. If during this time the grade has remained constant, the additional power due to the increase of speed of the motor would probably bring the speed of shaft 19 back to or beyond the original speed. When the shaft 19 and gear 21 are revolving at the same speed as gear 23, gear 30 and shaft 45 stop and remain stationary. However, the regulating and constraining unit would continue to rotate due to the overrunning clutch connection and the inertia of its parts. This would maintain a widened ratio for a short duration of time. There would, however, be a progressive decrease in the speed of the regulating and constraining unit due to friction and the regulating and constraining unit would sooner or later come to a stop unless reacted upon by the process just described.

It is evident from the foregoing discussion that as long as the motor is developing enough power to drive the vehicle at a uniform or accelerated rate of speed, the speed selector unit would be inactive. However, the moment the speed of shaft 19 decreases, the speed ratio selector unit again becomes active. This action is reacted over and over again as the load and speed varies.

The highest possible speed for shaft 19 for the least R. P. M. of shaft 10 is insured because the ratio is very wide when the vehicle is first started. The ratio is then progressively automatically narrowed until the optimum ratio is reached. Any further narrowing of the ratio would increase the load beyond the capacity of the motor and cause a decrease in the speed of shaft 19, thus putting the speed ratio selector unit in operation again.

While in this particular design the maximum speed of shaft 19 is at a one-to-one ratio with shaft 10, it would be practical to increase the rear axle speed by suitable gearing. Such gearing and a reversing gearing are indicated by a box referred to by character 56. A mechanical or electrical control from selector arm 55 is indicated by the dash-dot line 57. This would not change the minimum speed in the least as the minimum speed of shaft 19 would always be substantially zero. The ability of being able to step up the maximum speed and thus widening the range without effecting the minimum speed is an asset very greatly desired simply because it would permit the engine to always operate in such an extremely wide range that the optimum ratio between the engine and rear wheel could be maintained. This is a feature conspicuously absent in most modern day fluid torque converters whose range of torque multiplication is in the order of one-to-one maximum to two-and-a-half-to-one minimum. When raising the maximum speed, the minimum drive speed would also have to be raised. For this reason most fluid torque converters must be supplemented with an additional emergency low gear. This, of course, would not be necessary in my invention.

My invention also possesses the characteristics of dual range performance. In the cruising range, the motor would automatically seek to drive the vehicle at the highest possible speed for the least possible speed of the motor. If for one reason or another the speed of the motor drops below that speed at which the governor is set to energize the clutch 43, then the governor would actuate the control switch, thus energizing clutch 43 and the regulating and constraining unit would be drivingly connected to shaft 10. While the shaft 10 would be attempting to drive the regulating and constraining unit at one-half its speed, this would not necessarily be possible as the speed of both the regulating and constraining unit and the interconnecting unit would now be determined by the relative speeds of shaft 10 and shaft 19. When shafts 10 and 19 are revolving in a direction opposite to each other, the interconnecting unit could never be driven by the shaft 10 and 19 at a speed greater than one-half the speed of shaft 10. Even though shaft 10 was attempting to drive the regulating and constraining unit at one-half the speed of shaft 10, the regulating and constraining unit would be slowed down to the speed of interconnecting unit which of course would be one-half the difference between shafts 10 and 19.

As previously explained, this difference in speed between the input and output shaft of the magnetic clutch, caused by a drive of greater speed than the output shaft can turn, would result in no damage being done as there would only be a slippage within the clutch itself. Other types of clutches are also available for this purpose.

As long as the speed of shaft 10 remains below the speed at which the clutch is energized, the motor can be accelerated without having any immediate driving effect upon shaft 19. Furthermore, under ordinary conditions, since the car is receiving no power, it would lose speed. Should the motor again be accelerated to a speed greater than the governor setting, the motor would now drive the car and interconnecting unit and regulating and constraining unit would be rotating at a speed equal to one-half the difference between shaft 10 and 19. While the speed at which the motor would again drive the car is constant, determined by the setting of the governor, the speed at which the car has been slowed to is infinitely variable between the limits of zero and the governor setting, therefore, the speed of the interconnecting unit, and the regulating and constraining unit could be any speed between zero and one-half the speed of shaft 10. Any rotation of the interconnecting unit would provide a wider or lower ratio between shaft 10 and shaft 19. The faster the rotation of the interconnecting unit at the moment the motor commences to drive the vehicle, the wider the relative ratio. This wider than a one-to-one ratio would naturally provide quicker acceleration which is usually required in traffic. This provides a second range.

It has been mentioned that when once the car has been put in motion, the relative speed between shaft 10 and shaft 19 can be instantly changed to a one-to-one ratio by retarding the throttle, thereby permitting the car to drive the motor. This situation of the car driving the motor causes a reversal of torque which would attempt to drive the interconnecting unit in the same direction as shaft 19. However, the tendency of the interconnecting unit to turn in the same direction as shaft 19 would be prohibited due to the non-reciprocal driving characteristics between worm wheel 16 and gears 14.

The car would simply drive the motor at a one-to-one ratio. This positive connection between the car and the motor would provide engine braking regardless of how slow the vehicle was moving. This ability of using the motor to brake the car is lacking in the conventional fluid coupling. At a certain velocity in the conventional fluid coupling the braking effect of the motor diminishes as the car and the motor lose speed until is is practically nil.

In the event that the vehicle is brought to a complete stop during the process of ascending a steep incline it cannot roll backward as long as the selector arm is in the drive or neutral position and the motor is running. In fact, it could not be pushed backward even though acted upon by an additional force unless the added force were large enough to overcome the power developed by the engine, thus causing the engine to come to a complete stop and then reverse its direction of rotation.

This ability of being able to prevent backward motion when stopped on a steep grade without resorting to the manual use of the brake is a feature greatly desired and several car manufacturers have accomplished this by the additional supplementary apparatus to the braking system.

It should be noted that this hill-holding effect is an inherent characteristic of my invention and is the result of its specific mechanical structure. It is apparent that the speed at which the engine is idling would have to be less than the speed at which the governor is set to connect the shaft 10 with the regulating and constraining unit or the vehicle could not be brought to a complete stop. The reason for this peculiar hill-holding or engine braking characteristic of my invention is at once obvious when a reexamination of the five cases effecting the action of the interconnecting unit is made.

In order for the car to roll or be pushed backward, while the engine is idling and the selector lever is in drive position, the driven shaft 19 would have to rotate in an opposite direction to its normal forward drive direction of rotation, which is the same direction as the driving shaft 10. Then both of the shafts and their corresponding gears would be rotating in the same direction and the interconnecting unit would have to travel in the same direction and at the intermediate speed (Case 2). With both gears rotating in the same direction, the intermediate speed between the two gears would always be greater than one half the speed of the fastest turning gear. But the speed at which the regulating and constraining unit is driven could never be greater than one half the speed of the shaft 10. Since the interconnecting unit could never be driven at a speed greater than the speed of the regulating and constraining unit, shaft 19 could not be turned in an opposite direction unless the motor were brought to a complete stop and driven in a reverse direction.

While I have shown a combination of worm gear and worm wheel as the motion-regulating and constraining means, other mechanisms performing the same tasks could be substituted without departing from the scope of the invention. For example, a cylindrical cam and follower would suffice. The cylindrical cam could drive the follower but the follower could not drive the cam.

Figure 4:
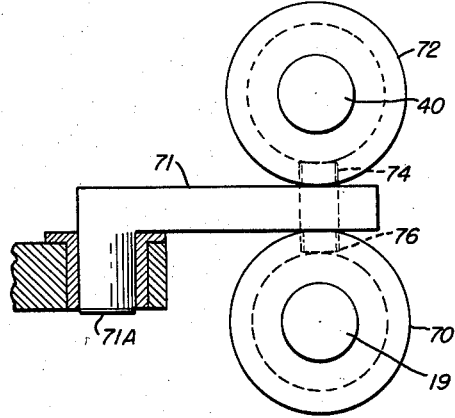
Figure 4 is a cam and follower form of modified embodiment of the regulating and constraining portion of the principal illustration showing this means to alter the structure thereof without departing from the scope of the invention.
Figure 5:
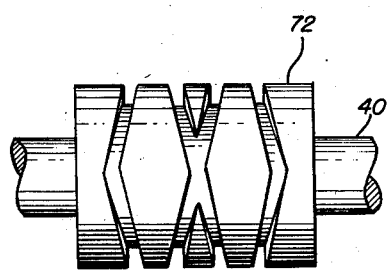
Figure 5 is a perspective view of one of the helical-groove cams.

An example of such a cam and follower is shown in Figures 4 and 5 of the drawings. A cam 70, in place of a worm gear 17, is driven by the carrier 15. An identical cam 72 is used to replace worm gear 14. A follower arm 71, having follower arm pins 74 and 76, is provided to couple the cams 70 and 72. The follower arm 71 is pivoted on a suitable shaft as indicated by the reference character 71A. The surfaces of cams 70 and 72 are grooved with reversing grooves as indicated best in Figure 5 of the drawings. Thus, the cam 70 tends to drive the follower arm 71 in a swinging path. However, the follower arm 71 can follow the cam 70 and move in such a swinging path only if the cam 72 is rotating in the proper direction to allow such movement. Furthermore, the rate at which the cam 70 can swing the follower arm 71 is determined by the speed at which the cam 72 is rotating. The pins 74 and 76 form a solid interconnection between cams 70 and 72, and serve the identical function served by the worm wheel 16 in Figures 1 and 2.

Figure 2:
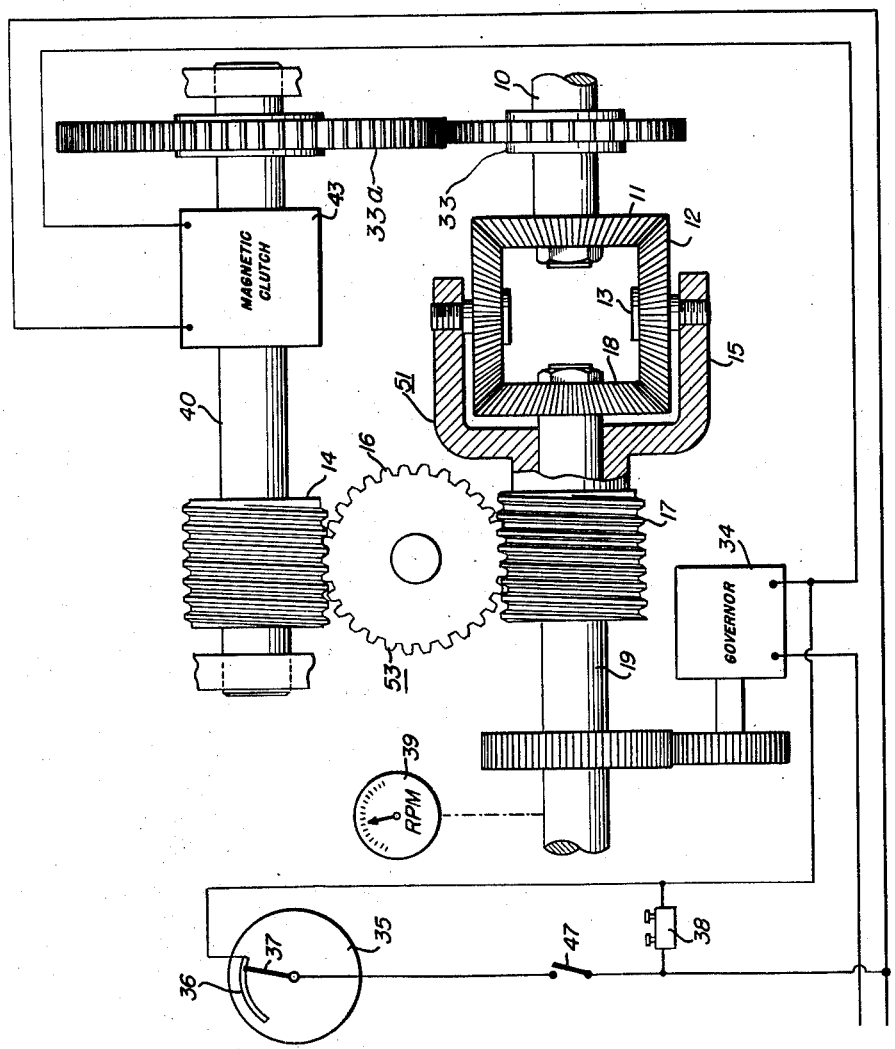
Figure 2 is an alternate type of construction, also diagrammatically illustrated, which is simplified for specific conditions.
Figure 3:
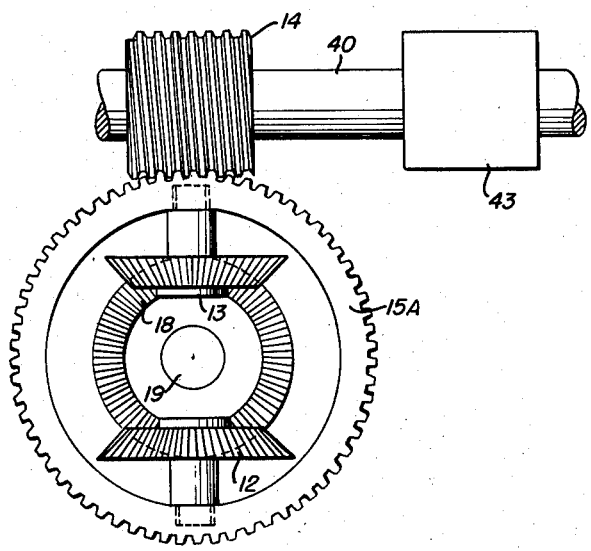
Figure 3 is a modified embodiment of the principal illustration, included herein to show one of the many alterations possible in adapting the diagrammatically illustrated construction to actual operating conditions.

Figure 3 of the drawings illustrates an alternate form of construction which may find use in actual adaptation of the invention for a useful purpose and provides a more compact structure than the diagrammatic illustration shown in Figures 1 and 2. In Figure 3 the carrier 15 is provided with a peripheral band 15A into which the worm gear teeth are cut similar to the teeth on worm wheel 16. These teeth then interact directly with the worm gear 14 without the necessity of providing an intermediate structure. There is never sufficient force transmitted through clutch 43 to drive the carrier 15, and consequently there is no need to lock the train against such driving. The slight force necessary to run the shaft 40 will, nevertheless, be sufficient to control much larger forces tending to rotate the carrier 15. The alternate construction shown in Figure 3 provides the shaft 40 in an angular position with respect to shafts 10 and 19.

In Figure 2 of the drawings a modification of the invention is illustrated which may be used for certain types of industrial purposes.

In the modification shown in Figure 2, meshed gears 33 and 33A are illustrated in place of the gear train shown in Figure 1. The slippable clutch 43 is employed in the same manner as in Figure 1 between the drive from shaft 10, and the worm gear 14. However, a governor 34 is directly connected to the driven shaft, and is therefore responsive to the driven shaft rather than the driving shaft. In Figure 1, the governor is responsive to the speed of the driving shaft. The governor 34 is employed to provide a maximum speed for the driven shaft by energizing the clutch 43 at a particular selected maximum speed. Energization of the clutch 43 permits rotation of the worm wheel 16, and consequently permits rotation of the carriage 15 and a widening of the speed ratio between the driving and driven shaft. With a fixed driving speed, such energization of the clutch 43 will result in a slower and more powerful drive of the driven shaft.

A distributor 35, very similar to the common automotive ignition system distributor, is provided to regulate the ratio between the driving and driven shafts and substantially maintain that ratio under all load conditions. The distributor 35 is provided with a bus bar 36 and a contact arm 37. The contact arm is driven in a rotary path by means of a separate electrical drive, or by a mechanical interconnection with the driving means for the shaft 10.

Figure 2 also shows a simple control switch 38 for actuating the clutch 43 at will.

In its industrial application the transmission would have several objects among which the following are a few: a speed reducer, a machine starter, an overload protector, and an adjustable speed transmission.

Of the above, the feature of adjustable speed is one of the most important. This can be accomplished by at least three methods:

(1) By using the speed responsive governing means 34 in conjunction with either the driven shaft 19 or with the interconnecting unit, but without the illustrated distributor 35. A switch 47 is used to cut out the time responsive governor 35.

In order to select any speed within the range of the transmission, the regulating and constraining unit is first put into motion by its source of power. This is accomplished by actuating the control switch 38, thereby energizing the clutch 43. The regulating and constraining unit is now rotating at a speed which will permit the interconnecting unit to rotate at one half the speed of driving gear 11. When the interconnecting unit has been brought up to speed, which would be almost instantaneously, switch 38 is thrown and the clutch 43 is de-energized, thus permitting the regulating and constraining unit to gradually slow down. As the regulating and constraining unit slows down, so does the interconnecting unit. This of course speeds up the driven shaft.

This speed responsive governing means 34, which is shown operatively connected to the driven shaft 19, can be adjusted to operate at a predetermined speed. When the speed of shaft 19 exceeds this predetermined speed, the governing means 34 actuates the control switch re-energizing clutch 43. The driving means is now attempting to drive the regulating and constraining unit at one half the difference between driving gear 11 and driven gear 18. Therefore, the regulating and constraining unit must turn in relationship to the speed of the interconnecting unit. Any difference in the speeds of the input and output shafts of clutch 43 is compensated for by harmless slipping within the clutch itself.

The speed responsive governing means is extremely sensitive and therefore the speed of the driven gear 18 has only to exceed the predetermined speed by a fraction of a revolution before the clutch 43 is re-energized, thus putting the regulating and constraining unit in motion and interrupting the flow of power from driving gear 11 to driven gear 18. When the flow of power is interrupted, the load will exert a decelerating effect upon driving shaft 19. As the speed of driven shaft 19 and driven gear 18 falls below the predetermined speed, the governing means 34 actuates the control switch thus de-energizing the clutch 43.

The regulating and constraining unit once again begins to lose speed, permitting the driving gear 11 to accelerate thed riven gear 18. This process of alternately energizing and de-energizing clutch 43 holds the speed of driven shaft 19 within very extreme limits of the desired predetermined speed.

(2) The second method of controlling the speed of driven shaft 19 at a specific speed within extremely small limits, is accomplished by using the time responsive governing means 35 in conjunction with the driving shaft 10. Switch 47 is closed to use the regulator 35. The time responsive means 35 energizes and de-energizes clutch 43 with such rapidity that the speed of driven shaft 19 can be held within close limits of a predetermined speed.

In order to bring the speed of driven shaft 19 up to the predetermined speed the same procedure as followed in method 1 could be used. Clutch 43 is energized, putting the regulating and constraining unit and the interconnecting unit in motion. Then clutch 43 is de-energized, permitting both the regulating and constraining unit and the interconnecting unit to gradually lose speed. The shaft 19 is equipped with a tachometer 39 which indicates the exact speed of shaft 19. When the speed of shaft 19 reaches the desired speed, the switch 38 is thrown either manually or automatically, allowing the current to flow through the time responsive governing means 35, thus energizing and de-energizing clutch 43.

(3) When a definite ratio between the driving shaft 10 and the driven shaft 19 must be maintained, the regulating and constraining unit could be driven by a very small conventional type variable speed transmission. The advantage here, of course, would be that power at variable speeds and torques could be transmitted in large horse power and controlled by relatively small force.

It is believed that the following short specific situation analyses will aid in the better understanding of the functions and advantages of the invention:

(1) ASSUMPTION

The regulating and constraining means driven from an independent source of motion at a speed equal to or greater than one half the speed of the driving means.

*Result*

(a) No driving effect of 10 on 19.

(b) Interconnecting unit is driven at one half the difference in speed of 10 and 19. In this case, at one half the speed of 10.

(c) The interconnecting unit restricts the rotation of the regulating and constraining means to a rotational speed corresponding to the proper rotation for the interconnecting unit.

(d) If the permitted speed of the regulating and constraining means is less than the speed of its source of motion, there will only be a harmless slippage in the clutch interconnection.

(e) No power will be transmitted from 10 to 19.

(2) ASSUMPTION

The regulating and constraining means is driven from an independent source of power at a speed less than one half the speed of 10.

*Result*

(a) The degree or extent of rotation of the interconnecting unit is limited by the regulating and the constraining means, thus altering the driving effect of 10 upon 19 and to produce a selected relative ratio.

(3) ASSUMPTION

The regulating and constraining means is brought up to maximum speed and then is disengaged from its source of driving motion.

*Result*

(a) The regulating and constraining means will continue to rotate for a limited time but at a progressively decreasing rate of speed.

(b) As the regulating and constraining means slows down, the interconnecting unit is also slowed down. Thus, 10 drives 19 at a progressively increasing rate of speed from zero to maximum.

(4) ASSUMPTION

The regulating and constraining means is driven by a source of motion but in the opposite direction to the direction in which the interconnecting unit is attempting to rotate.

*Result*

(a) The regulating and constraining means is stationary due to the opposing force produced by the interconnecting unit.

(b) The interconnecting unit is only kept from turning.

(c) 10 drives 19 at maximum velocity.

(d) Harmless slippage in clutch.

(5) ASSUMPTION

The regulating and constraining means is driven from an independent source of motion at a constant speed, but 10 can be accelerated.

*Result*

(a) As 10 is accelerated, 19 is also accelerated and the ratio between 10 and 19 is narrowed.

(6) ASSUMPTION

The regulating and constraining means is driven from an independent source of motion at a decreasing rate of speed and 10 is accelerated.

*Result*

(a) Ratio will be narrowed by both factors.

(7) ASSUMPTION

Driven shaft 19 is put in motion by the driving shaft 10, and then the power is interrupted.

*Result*

(a) 19 will now drive 10 due to the inertia of the moving driven parts.

(b) The interconnecting unit will tend to turn in a direction opposite to its normal drive direction.

(c) In the event that the interconnecting unit possesses any motion, it will be brought to a complete stop due to its nor-reciprocal connection with the regulating and constraining means.

(d) Instant adjustment to a one-to-one ratio between 10 and 19.

(8) ASSUMPTION

The slippage clutch interconnecting means can be selectively engaged and disengaged.

*Result*

(a) The operator can select any ratio at will within the range of the transmission by first putting 19 in motion and then interrupting the flow of power and accelerating 10 to the required velocity for a given ratio.

(b) Effect for a limited time only until the ratio is self-adjusted back to a one-to-one ratio.

The description and discussion of the disclosed transmission could be extended considerably without repetition, but it is believed that there has been a sufficient disclosure to enable anyone skilled in the art to readily appreciate the various applications and advantages which may be obtained. The advantages may be simply restated by calling attention to the fact that power transmission in infinite ratios within the limits of the transmission may be readily obtained. The range is extremely wide with high efficiency in all ratios. There is positive drive at all times. The transmission may be either fully automatic or operator controlled and adjustable. Without extra equipment, the transmission selects the most economical ratio. It provides engine braking. The construction is the essence of simplicity and can be made extremely rugged and compact. The ratio of drive is varied by changing the speed of the motor. The transmission is self-powered and has a natural dual range It is not speed responsive.

Although the invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A power transmission comprising, a driving shaft, a driven shaft, a gear train interconnecting said shafts, said gear train having an epicyclic characteristic and including first gear means revolvable with said driving shaft, second gear means revolvable with said driven shaft, pinion gear means interconnecting said first and second gear means, a revolvable carriage mounting said pinion gear means, said carriage driven in a revolvable path by said pinion gear means, a regulating and constraining gear train driven by said carriage, said regulating and constraining gear train including a first gear driven by said carriage, an intermediate gear driven by said first gear, the interconnection between said first gear and intermediate gear being a non-reciprocal drive whereby said intermediate gear cannot drive said first gear, a second gear meshed with said intermediate gear, the drive interconnecting between said second gear and the intermediate gear being non-reciprocal from said second gear to said intermediate gear, whereby the rotation of the intermediate gear, and consequently the rotation of the pinion gear means is controlled by rotation of the second gear, and said second gear requiring no more power to drive it than sufficient to overcome frictional resistance, and means to rotate said second gear in the direction releasing said intermediate gear to rotate under drive from said first gear, said means including a linkage from said driving shaft, a slippable clutch in said linkage.

2. A power transmission comprising, a driving shaft, a driven shaft, a gear train interconnecting said shafts, said gear train having an epicyclic characteristic and including first gear means revolvable with said driving shaft, second gear means revolvable with said driven shaft, pinion gear means interconnecting said first and second gear means, a revolvable carriage mounting said pinion gear means, said carriage driven in a revolvable path by said pinion gear means, a regulating and constraining gear train driven by said carriage, said regulating and constraining gear train including a first gear driven by said carriage, an intermediate gear driven by said first gear, the interconnection between said first gear and intermediate gear being a non-reciprocal drive whereby said intermediate gear cannot drive said first gear, a second gear meshed with said intermediate gear, the drive interconnecting between said second gear and the intermediate gear being non-reciprocal from said second gear to said intermediate gear, whereby the rotation of the intermediate gear, and consequently the rotation of the pinion gear means is controlled by rotation of the second gear, and said second gear requiring no more power to drive it than sufficient to overcome frictional resistance, and means to rotate said second gear in the direction releasing said intermediate gear to rotate under drive from said first gear, said means including a linkage from said driving shaft, a slippage clutch in said linkage, and fly-wheel means for said second gear.

3. A power transmission comprising, a driving shaft, a driven shaft, a gear train interconnecting said shafts, said gear train having an epicyclic characteristic and including first gear means revolvable with said driving shaft, second gear means revolvable with said driven shaft, pinion gear means interconnecting said first and second gear means, a revolvable carriage mounting said pinion gear means, said carriage driven in a revolvable path by said pinion gear means, a regulating and constraining gear train driven by said carriage, said regulating and constraining gear train including a first gear driven by said carriage, an intermediate gear driven by said first gear, the interconnection between said first gear and intermediate gear being a non-reciprocal drive whereby said intermediate gear cannot drive said first gear, a second gear meshed with said intermediate gear, the drive interconnecting between said second gear and the intermediate gear being non-reciprocal from said second gear to said intermediate gear, whereby the rotation of the intermediate gear, and consequently the rotation of the pinion gear means is controlled by rotation of the second gear, and said second gear requiring no more power to drive it than sufficient to overcome frictional resistance, primary means to rotate said second gear in the direction releasing said intermediate gear to rotate under drive from said first gear, means including a linkage from said driving shaft, a slippable clutch in said linkage, secondary means to rotate said second gear in like manner, said secondary means including a differential drive connected to said driven shaft having a fly-wheel drive member connected to said driven shaft by an overrunning clutch for operation of said differential only when the driven shaft is retarded.

4. A power transmission comprising, a differential device including two differential gear members, a rotatable pinion supporting member and a differential pinion journalled in said pinion supporting member, and meshing with said gear members, a driving element rotating one of said members, a driven element rotated by another of said members, and a regulating and constraining means driven by the remaining member, said regulating and constraining means having first means driven by said remaining member, said first means and said remaining member being interlinked to operate as a unit in that one cannot operate without the other, intermediate means in driven relationship with said first means, the interconnection between said first means and said intermediate means being non-reciprocal to the extent that said intermediate means cannot drive said first means and said first means cannot operate unless said intermediate means is operating, a second means in driving relationship with said intermediate means, the interconnection between said second means and intermediate means being non-reciprocal to the extent that said intermediate means cannot drive said second means and said second means cannot operate unless said intermediate means is operating, whereby the operation of the intermediate means, and consequently the operation of the carriage, is controlled by operation of the second means at a rate up to but not greater than the driving tendency imposed upon the intermediate means by the first means, said control operation of the second means exerting no actual driving force on the intermediate means but rather relieving the intermediate means to operate under the drive of said first means, speed responsive control means responsive to deceleration of the driven element to operate said second means for drive control, said speed responsive control comprising a mass member mounted to change relative position with respect to said driven element by inertia effect upon deceleration of said driven element, and drive means responsive to said change in relative position exerting a drive force on said second means in a direction to release the intermediate means.

5. A power transmission, comprising, a differential device including two differential gear members, a rotatable pinion supporting member and a differential pinion journalled in said pinion supporting member and meshing with said gear members, a driving element rotating one of said members, a driven shaft rotated by another of said members, and a regulating and constraining means driven by the remaining member, said regulating and constraining means having first means driven by said remaining member, said first means and said remaining member being interlinked to operate as a unit in that one cannot operate without the other, intermediate means in driven relationship with said first means, the interconnection between said first means and said intermediate means being non-reciprocal to the extent that said intermediate means cannot drive said first means and said first means cannot operate unless said intermediate means is operating, a second means in driving relationship with said intermediate means, the interconnection between said second means and intermediate means being non-reciprocal to the extent that said intermediate means cannot drive said second means and said second means cannot operate unless said intermediate means is operating, whereby the operation of the intermediate means, and consequently the operation of the carriage, is controlled by operation of the second means at a rate up to but not greater than the driving tendency imposed upon the intermediate means by the first means, said control operation of the second means exerting no actual driving force on the intermediate means but rather relieving the intermediate means to operate under the drive of said first means, and speed responsive control means responsive to deceleration of the driven shaft to operate said second means for drive control, said speed responsive control comprising a first differential having a first gear nonrotatively carried by said driven shaft and a second gear journalled thereon, a nonrevolving pinion gear means, interconnecting said gears of the first differential, a second differential having a first gear nonrotatively carried by said driven shaft and a second gear journalled thereon, a pinion gear means interconnecting said gears of the second differential, a revolvable gear mounting said pinion gear means of the second differential as a carriage therefore, a drive interconnection from said revolvable gear in driving relationship with said second means of the regulating and constraining means, said journalled gears of the first and second differentials being adjacent on said driven shaft, a fly-wheel nonrotative with respect to the journalled second gear of the second differential, and an overrunning clutch connecting said journalled second gear of the first differential to said fly-wheel.

6. A power transmission, comprising, a differential device including two differential gear members, a rotatable pinion supporting member and a differential pinion journalled in said pinion supporting member and meshing with said gear members, a driving element rotating one of said members, a driven element rotated by another of said members, and a regulating and constraining means driven by the remaining member, said regulating and constraining means having first means driven by said remaining member, said first means and said remaining member being interlinked to operate as a unit in that one cannot operate without the other, intermediate means in driven relationship with said first means, the interconnection between said first means and said intermediate means being non-reciprocal to the extent that said intermediate means cannot drive said first means and said first means cannot operate unless said intermediate means is operating, a second means in driving relationship with said intermediate means, the interconnection between said second means and intermediate means being non-reciprocal to the extent that said intermediate means cannot drive said second means and said second means cannot operate unless said intermediate means is operating, whereby the operation of the intermediate means, and consequently the operation of the remaining member, is controlled by operation of the second means, said second means requiring no more power to drive it than sufficient to overcome frictional resistance, primary means to rotate said second means in the direction releasing said intermediate means to rotate under drive from said first means, said primary means including a linkage from said driving shaft, a slippable clutch in said linkage, secondary means to rotate said second means in like manner, said secondary means including a differential drive connected to said driven shaft and having a fly-wheel drive member connected to said driven shaft by an overrunning clutch for operation of said differential only when the driven shaft is retarded.

7. A power transmission, comprising, a differential device including two differential gear members, a rotatable pinion supporting member and a differential pinion journalled in said pinion supporting member and meshing with said gear members, a driving element rotating one of said members, a driven element rotated by another of said members, and a regulating and constraining means driven by the remaining member, said regulating and constraining means having first means driven by said remaining member, said first means and said remaining member being interlinked to operate as a unit in that one cannot operate without the other, intermediate means in driven relationship with said first means, the interconnection between said first means and said intermediate means being non-reciprocal to the extent that said intermediate means cannot drive said first means and said first means cannot operate unless said intermediate means is operating, a second means in driving relationship with said intermediate means, the interconnection between said second means and intermediate means being non-reciprocal to the extent that said intermediate means cannot drive said second means and said second means cannot operate unless said intermediate means is operating, whereby the operation of the intermediate means, and consequently the operation of the remaining member, is controlled by operation of the second means, said second means requiring no more power to drive it than sufficient to overcome frictional resistance, control means to release said intermediate means to rotate under drive from said first means, said control means including a linkage from said driving shaft imposing a rotative drive force on said second means tending to drive said second means at a speed a preselected ratio to the speed of said driving shaft, and an overpowerable interconnection in said control means allowing said second means to rotate in opposition to said control means under an overpowering force from a source other than said control means, and fly-wheel means for said second means, operative to operate said second means at a gradually slowing rate after said control means is placed in said inactive condition.

8. In an epicyclic gear train power transmission having a power imput to said gear train, a work drive output from said gear train, and a remaining member, the speed of operation of the remaining member being the determinator of the speed and power ratio between the power input and work drive output, the provision of an improved regulating and constraining means to provide control of said remaining member, said regulating and constraining means comprising, a self-locking driven device connected to said remaining member, said driven device having the characteristic of holding the remaining member from rotation under drive of said remaining member unless said driven device is operating from a second drive source, a second drive source means to drive said driven device in a direction releasing said remaining member to operate under drive from said power imput, said second drive source including a linkage from said power input, and said linkage including an operator adjustable clutch means arranged to slip at a preselected amount of torque and having transmitting capacity to operate the driving device and the ability to slip continually without damage while transmitting at capacity.

9. In an epicyclic gear train power transmission having a power imput to said gear train, a work drive output from said gear train, and a remaining member, the speed of operation of the remaining member being the determinator of the speed and power ratio between the power input and work drive output, the provision of an improved regulating and constraining means to provide control of said remaining member, said regulating and constraining means comprising, a self-locking driven device connected to said remaining member, said driven device having the characteristic of holding the remaining member from rotation unless said driven device is operating from a second drive source, a second drive source means to drive said driven device in a direction releasing said remaining member to operate under drive from said power imput, said second drive source including a linkage from said power imput, and said linkage including an operator adjustable clutch means arranged to slip at a preselected amount of torque and having transmitting capacity to operate the driving device and the ability to slip continually without damage while transmitting at capacity.

10. In an epicyclic gear train power transmission having a power imput to said gear train, a work drive output from said gear train, and a remaining member, the speed of operation of the remaining member being the determinator of the speed and power ratio between the power input and work drive output, the provision of an improved regulating and constraining means to provide control of said remaining member, said regulating and constraining means comprising, a self-locking gear train device driven by said remaining member, said gear train having the characteristic of holding the remaining member from rotation unless said gear train is operated from a second drive source, a second drive source means to drive said uni-directional gear train driveable device in a direction releasing said remaining member to operate under drive from said power input, said second drive source including a linkage from said power imput, said linkage including an operator adjustable clutch means arranged to slip at a preselected amount of torque and having transmitting capacity to operate the driving device and the ability to slip continually without damage while transmitting at capacity, said clutch having a fully released condition, and a fly wheel mass in said means to drive the gear train, whereby the gear train is kept in motion for an extended period of gradual slowing upon full release of the clutch.

11. In an epicyclic gear train power transmission having a power imput to said gear train, a work drive output from said gear train, and a remaining member, the speed of operation of the remaining member being the determinator of the speed and power ratio between the power imput and work drive output, the provision of an improved regulating and constraining means to provide control of said remaining member, said regulating and constraining means comprising, a self-locking gear train device driven by said remaining member, said gear train drive device having at least one worm gear therein providing the characteristic of holding the gear train from rotation under drive of said remainnig member unless the said worm gear is rotated from a second drive source, said worm gear being securely held against lateral movement under drive force from said remaining member, means to drive said worm gear in a direction releasing said remaining member to operate under drive from said power imput, said second drive source including a linkage from said power imput, and said linkage including an operator adjustable clutch means arranged to slip at a preselected amount of torque and having transmitting capacity to operate the driving device and the ability to slip continually without damage while transmitting at capacity.

12. In an epicyclic gear train power transmission having a power imput to said gear train, a work drive output from said gear train, and a remaining member, the speed of operation of the remaining member being the determinator of the speed and power ratio between the power imput and work drive output, the provision of an improved regulating and constraining means to provide control of said remaining member, said regulating and constraining means comprising, a self-locking driven device connected to said remaining member, said driven device having the characteristic of holding the remaining member from rotation unless said driven device is operating from a second drive source, a second drive source means to drive said driven device in a direction releasing said remaining member to operate under drive from said power imput, said second drive source including a linkage from said power imput, and said linkage including an operator adjustable clutch means arranged to slip at a preselected amount of torque and having transmitting capacity to operate the driving device and the ability to slip continually without damage while transmitting at capacity, said slip clutch haivng an output in constant drive relationship with said driven device, thereby exerting a driving influence upon said driven device at all times that the clutch is operating.

13. A power transmission, comprising, an epicyclic gear train, first, second and third shafts operatively connected to said gear train, said first shaft being a driving shaft, the second shaft being a work drive output, the third shaft being a transmission regulating shaft, a regulating and constraining means in control of said remaining member, said regulating and constraining means being a self-locking uni-directional drive device connected to said remaining member, said drive device having the characteristic of holding the remaining member from rotation unless said drive device is operating from a second drive source, means to drive said uni-directional drive device in a direction releasing said remaining member to operate under drive from said power imput, said means to drive the drive device including a linkage from said driving shaft, an electrical particle clutch of adjustable torque transmission in said linkage, and control means including means providing variable amounts of energizing electric current to said clutch.

14. A power transmission, comprising, an epicyclic gear train, first, second and third shafts operatively connected to said gear train, said first shaft being a driving shaft, the second shaft being a work drive output, the third shaft being a transmission regulating shaft, a regulating and constraining means in control of said remaining member, said regulating and constraining means being a self-locking uni-directional drive device connected to said remaining member, said drive device having the characteristic of holding the remaining member from rotation unless said drive device is operating from a second drive source, means to drive said uni-directional drive device in a direction releasing said remaining member to operate under drive from said power imput, said means to drive the drive device including a linkage from said driving shaft, an electrical particle clutch of adjustable torque transmission in said linkage, and electrical control means adapted to reduce the current and consequently the torque transmitted to a degree just less than sufficient to overcome frictional losses in said uni-directional drive device and thereby provide a prolonged and gradual period of slowing of the third shaft to a stop.

15. A power transmission, comprising, a differential device including two differential gear members, a rotatable pinion supporting member and a differential pinion journalled in said pinion supporting member and meshing with said gear members, a driving element rotating one of said members, a driven element rotated by another of said members, and a regulating and constraining means non-reciprocally drivingly connected to said remaining member, including a releasable, interlocking holding means, thereby holding the remaining member from rotation under drive of said driving member, unless said releasable interlocking holding means is operating, said releasable, interlocking holding means requiring no more power to drive it than sufficient to overcome frictional resistance, primary means to rotate said releasable interlocking holding means, seconadry means to rotate said releasable interlocking holding means in a like manner, said secondary means including a differential drive connected to said driven shaft and having a fly wheel drive member connected to said driven shaft by an over-running clutch for the operation of said differential when the driven shaft is retarded.

16. A power transmission, comprising, a differential device including two differential gear members, a rotatable pinion supporting member and a differential pinion journalled in said pinion supporting member and meshing with said gear members, a driving element rotating one of said members, a driven element rotated by another of said members, and a regulating and constraining means non-reciprocally drivingly connected to said remaining member, said regulating and constraining means including a releasable interlocking holding means, thereby holding the remaining member from rotation under drive of said driving member, unless said releasable interlocking holding means is operating, said releasable interlocking holding means requiring no more power to drive it than sufficient to overcome frictional resistance, primary means to rotate said releasable interlocking holding means, secondary means to rotate said releasable interlocking holding means in a like manner, said secondary means including a speed responsive control means responsive to deceleration of the driven shaft to operate said releasable interlocking holding means for drive control, said speed responsive control means comprising a first differential having a first gear non-rotatively carried by said driven member and a second gear journalled thereon, a non-revolving pinion gear means interconnecting said gears of the first differential, a second differential having a first gear non-rotatively carried by said driven member and a second gear journalled thereon, a pinion gear means interconnecting said gears of the second differential, a revolvable gear mounting said pinion gear means of the second differential as a carriage therefor, a drive, interconnection from said revolvable gear in driving relationship to said second means of the regulating and constraining means, said journal gears of first and second differential being adjacent on said driven shaft, a fly wheel non-rotative with respect to the journal second gear of the second differential, and an over-running clutch connecting said journal second gear of the first differential to said fly wheel.

17. A power transmission, comprising a differential device, including two differential gear members, a rotatable pinion supporting member, and a differential pinion journalled in said pinion supporting member and meshing with said gear members, a driving element rotating one of said members, a driven element rotated by one of said members, and a regulating and constraining means driven by the remaining member, said regulating and constraining means having a first cam, driven by said remaining member, said first cam and remaining member being interlinked to operate as a unit in that one cannot operate without the other, a follower in driven relationship with said first cam, the interconnection between said first cam and said follower being such that said follower cannot drive said first cam and the first cam cannot operate unless said follower is operating, a second cam in driving relationship with said follower, the interconnection between said second cam and said follower being such that said follower cannot drive said second cam and the second cam cannot operate unless said follower is operating, thereby the operation of the follower and consequently the operation of the remaining member is controlled by the operation of the second cam, means to operate said second cam in a direction releasing said remaining member to rotate under drive from said driving element, said means to operate including a linkage from said driving element and an adjustable torque slip clutch in said linkage.

18. A power transmission, comprising a differential device, including two differential gear members, a rotatable pinion supporting member, and a differential pinion journalled in said pinion supporting member and meshing with said gear members, a driving element rotating one of said members, a driven element rotated by one of said members, and a regulating and constraining means driven by the remaining member, said regulating and constraining means having a first cam driven by said remaining member, said first cam and remaining member being interlinked to operate as a unit in that one cannot operate without the other, a follower in driven relationship with said first cam, the interconnection between said first cam and said follower being such that said follower cannot drive said first cam and the first cam cannot operate unless said follower is operating, a second cam in driving relationship with said follower, the interconnection between said second cam and said follower being such that said follower cannot drive said second cam and the second cam cannot operate unless said follower is operating, thereby the operation of the follower and consequently the operation of the remaining member is controlled by the operation of the second cam, means to rotate said second cam in a direction releasing said remaining member to rotate under drive from said driving element, said means to rotate including a linkage from said drive shaft to thereby provide a drive in an exact positive relationship to said driving element, said linkage including an operator adjustable clutch means arranged to slip at a preselected amount of torque and having transmitting capacity to operate the driving device and the ability to slip continually without damage while transmitting at capacity.

19. A power transmission, comprising a differential device, including two differential gear members, a rotatable pinion supporting member, and a differential pinion journalled in said pinion supporting member and meshing with said gear members, a driving element rotating one of said members, a driven element rotated by one of said members, and a regulating and constraining means driven by the remaining member, said regulating and constraining means having a first cam driven by said remaining member, said first cam and remaining member being interlinked to operate as a unit in that one cannot operate without the other, a follower in driven relationship with said first cam the interconnection between said first cam and said follower being non-reciprocable to the extent that said follower cannot drive said first cam and the first cam cannot operate unless said follower is operating, a second cam in driving relationship with said follower, the interconnection between said second cam and said follower being non-reciprocable to the extent that said follower cannot drive said second cam and the second cam cannot operate unless said follower is operating, thereby the operation of the follower and consequently the operation of the remaining member is controlled by the operation of the second cam, drive means to operate said second cam at a controlled speed, said drive including a slippable clutch, a fly-wheel joined to said second cam adapted to store energy as said second cam is being rotatably driven, said fly-wheel stored energy being releasable to said second cam as the slippable clutch becomes inactive, thereby keeping said second cam in rotation for an extended period of gradual slowing.

20. A power transmission, comprising, a differential device, including two differential gear members, a rotatable pinion supporting member, and a differential pinion journalled in said pinion supporting member, and meshing with said gear members, a driving element rotating one of said members, a driven element rotated by one of said members, and a regulating and constraining means driven by the remaining member, said regulating and constraining means having a first cam driven by said remaining member, said first cam and remaining member being interlinked to operate as a unit in that one cannot operate without the other, a follower in driven relationship with said first cam, the interconnection between first cam and said follower being non-reciprocable to the extent that said follower cannot drive said first cam and said first cam cannot operate unless said follower is operating, a second cam in driving relationship with said follower, the interconnection between second cam and follower being non-reciprocable to the extent that said follower cannot drive said second cam and said second cam cannot operate unless said follower is operating, the operation of the follower and consequently the operation of the remaining member is being controlled by the operation of the second cam, the second cam requiring no more power to drive it than sufficient to overcome frictional resistance, control means to operate said second cam, said control means including an electrically energized adjustable torque slip clutch, and said control means also including adjustment means to adjust the torque transmitting capacity of said adjustable torque slip clutch by varying the amount of electrical current energizing said adjustable torque slip clutch.

21. A power transmission, comprising a differential device, including two differential gear members, a rotatable pinion supporting member, and a differential pinion journalled in said pinion supporting member and meshing with said gear members, a driving element rotating one of said members, a driven element rotated by one of said members, and a regulating and constraining means driven by the remaining member, said regulating and constraining means having a first cam driven by said remaining member, said first cam and remaining member being interlinked to operate as a unit in that one cannot operate without the other, a follower in driven relationship with said first cam, the interconnection between said first cam and said follower being non-reciprocable to the extent that said follower cannot drive said first cam and the first cam cannot operate unless said follower is operating, a second cam in driving relationship with said follower, the interconnection between said second cam and said follower being non-reciprocable to the extent that said follower cannot drive said second cam and the second cam cannot operate unless said follower is operating, thereby the operation of the follower and consequently the operation of the remaining member is controlled by the operation of the second cam, control means to operate said second cam, said control means including an electrically energized adjustable torque slip clutch, the torque transmitting capacity of said adjustable torque slip clutch being adjustable by a varying in the amount of electrical current energizing said adjustable slip clutch, and adjustment means to vary the electrical current energizing said adjustable torque slip clutch, said adjustment means being adjustable to decrease the amount of torque driving said second cam to an amount almost but not quite sufficient to overcome frictional resistance acting against said second cam, to thereby keep said second cam in rotation for an extended period of gradual slowing.

References Cited in the file of this patent

UNITED STATES PATENTS

| | | |
|---|---|---|
| 1,642,452 | Lovett | Sept. 13, 1927 |
| 1,832,822 | Thompson | Nov. 17, 1931 |
| 1,976,090 | Platzer | Oct. 9, 1934 |
| 2,422,343 | Duer | June 17, 1947 |
| 2,482,784 | Lohutke | Sept. 27, 1949 |

FOREIGN PATENTS

| | | |
|---|---|---|
| 151,013 | Great Britain | Sept. 14, 1920 |
| 201,805 | Germany | Sept. 18, 1908 |
| 287,234 | Great Britain | Mar. 19, 1928 |